United States Patent
Cromer et al.

(10) Patent No.: US 7,466,678 B2
(45) Date of Patent: Dec. 16, 2008

(54) SYSTEM AND METHOD FOR PASSIVE SCANNING OF AUTHORIZED WIRELESS CHANNELS

(75) Inventors: Daryl Carvis Cromer, Apex, NC (US); Philip John Jakes, Durham, NC (US); Howard Jeffrey Locker, Cary, NC (US); Ronald John Griffiths, Jr., Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 836 days.

(21) Appl. No.: 10/747,575

(22) Filed: Dec. 29, 2003

(65) Prior Publication Data

US 2005/0147070 A1 Jul. 7, 2005

(51) Int. Cl.
*H04Q 7/24* (2006.01)
*H04J 1/00* (2006.01)

(52) U.S. Cl. .................... 370/331; 370/343; 455/422.1; 455/450

(58) Field of Classification Search ................. 370/328, 370/329, 331, 338, 341, 343; 455/422.1, 455/450
See application file for complete search history.

(56) References Cited

U.S. PATENT DOCUMENTS

| | | | |
|---|---|---|---|
| 7,028,186 B1 * | 4/2006 | Stenman et al. | 713/173 |
| 2003/0074555 A1 * | 4/2003 | Fahn et al. | 713/156 |
| 2004/0039817 A1 * | 2/2004 | Lee et al. | 709/225 |
| 2004/0137905 A1 * | 7/2004 | Jeong et al. | 455/450 |
| 2004/0215959 A1 * | 10/2004 | Cook et al. | 713/156 |

FOREIGN PATENT DOCUMENTS

| | | |
|---|---|---|
| JP | 09-215044 | 8/1997 |
| JP | 10-210053 | 8/1998 |
| JP | 11-032111 | 2/1999 |
| JP | 2000-197118 | 7/2000 |
| JP | 2001-057688 | 2/2001 |
| JP | 2001-094572 | 4/2001 |
| JP | 2001-274816 | 5/2001 |
| JP | 2002-026931 | 1/2002 |
| JP | 2003-111123 | 4/2003 |
| WO | WO0162034 | 1/2001 |

* cited by examiner

*Primary Examiner*—Wing F Chan
*Assistant Examiner*—Saba Tsegaye
(74) *Attorney, Agent, or Firm*—Winstead P.C.

(57) ABSTRACT

A wireless device operating under the IEEE 802.11 specifications passively scans for a wireless access point coupled to a network backbone, wherein the scanning is performed using a default set of channels. The wireless device will then determine if the access point operates under an IEEE 802.11d specification, thus providing a country code to the wireless device. The wireless device will then utilize the country code to determine if the wireless device is legally authorized to communicate with the selected access point with wireless signal channels in addition to the default set of channels. The wireless device can then communicate with a selected access point utilizing any of the default set of channels and the wireless signal channels in addition to the default set of channels.

8 Claims, 6 Drawing Sheets

| Band | U.S. | | EU LA | | Japan | |
|---|---|---|---|---|---|---|
| | Regulatory | IEEE Spec | Regulatory | IEEE Spec | Regulatory | IEEE Spec |
| 1-11 | Y | Y | Y | Y | Y | Y |
| 12 | Y | N | Y | Y | Y | Y |
| 13 | Y | N | Y | Y | Y | Y |
| 14 | N | N | N | N | Y | Y |

*Fig. 3*

SYSTEM AND METHOD FOR PASSIVE SCANNING OF AUTHORIZED WIRELESS CHANNELS

TECHNICAL FIELD

The present invention relates generally to wireless communication devices, and in particular to wireless communication devices utilized in computer systems.

BACKGROUND INFORMATION

Implementation of computer-based wireless communication devices, including wireless local area networks (LANs) and wireless ready systems is a quickly emerging and evolving technology. Conventional computer-based wireless communication devices transmit radio frequency (RF) signals to wireless receivers of LANs. These devices include transmitters that both transmit and receive wireless communication within a particular bandwidth in the highly regulated RF spectrum.

The RF spectrum is a limited bandwidth spectrum that is allocated among a number of different services types/applications, including military, aviation, broadcast, and commercial communications. Because of the very limited bandwidth available within the RF spectrum, transmission in this medium is subject to strict government regulations. The regulations typically cover the type and parameters of the transmitters being utilized in a wireless network. These regulations cover modulation scheme, frequency of operation, and transmit power of the transmitters in order to avoid interference among the various authorized services utilizing the RF spectrum.

Transmitters comprise a combination of a circuit module called a radio coupled to an antenna. The antenna is a central part of the transmitter since the antenna is designed and tuned to optimize gain or attenuation for desired frequencies. Conventionally, manufacturers of transmitters obtain a license from the government authorizing the manufacturer to manufacture a particular type of transmitter, exhibiting particular parameters. The license covers both components of the transmitter unit (i.e., radio and antenna), and the license typically specifies exact protocols (i.e., operating parameters or ranges of parameters) for both components and the combination device. In the United States, for example, licenses are granted and regulated by the Federal Communication Commission (FCC). Also, the regulations require that the end users not be able to change or reconfigure the transmitter, which would result in operation outside of the authorized parameters. Any change made to the operating parameters, radio or antenna requires another application for license and authorization by the FCC.

It is essential for wireless LANs, such as those operating under the 801.11b and 802.11a frequency ranges, that they operate within authorized parameters. The IEEE 802.11b specification defines the allowable frequency bands (or channels) in which the transmitter may operate. However, on a worldwide basis, each country may only allow a subset of this spectrum to be utilized so as to avoid interference with country specific restricted bands, such as illustrated in FIG. 3. For example, in Japan, the IEEE specifications permit transmissions within all fourteen bands (See FIG. 2), and the Japanese government also permits operation within all of these fourteen bands. The European Union is slightly different in that the IEEE specifications and the government regulations do not permit transmissions within the fourteenth channel. As can be seen in FIGS. 2 and 3, the U.S. government permits transmissions within the first thirteen bands, while the IEEE specification only permits transmission within the first eleven bands.

For example, if the U.S. or European Union allow channel 14 or the IEEE changes the specification to allow 802.11b operation on channels 12 or 13 in the U.S., then it would be expected that access points operating on the additional channels would soon be available in the market. Most of the wireless cards would passively scan channels 1-14 and detect access points on channels 12 or 13. After detection of the access points on channels 12 or 13, the wireless cards would associate with the access points. However, this would violate the grant of authorization for the wireless card. In the U.S., this would be a violation of the FCC authorization for that particular wireless card.

SUMMARY OF THE INVENTION

The present invention is a system and method to ensure that radio transmitters remain within the authorized spectrum of governmental agencies, while supporting passive scanning. The present invention is a modified form of passive scanning, in that the device is set up to passively scan, but the allowable ranges for passive scanning is controlled by updated and authorized certificates. For 802.11b devices, the default certificate for operation could be on channels 1-11 as loaded into the system during a preload operation when the wireless device is turned on or booted up. The present invention uses the IEEE 802.11d extension to the IEEE 802.11 specification, which provides a country code into its protocol for associating and communicating with wireless devices. The client device would be restricted to the default channels 1-11, unless given specific information about the country location from the 802.11d association. The client device can use the country code to determine the total allowable ranges for a passive scan operation.

Periodically, the wireless device can obtain a new certificate from a certificate server, which will define the channel/frequency capabilities for individual countries on an updated basis.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 illustrates channel regulation within various geographical locations;

DETAILED DESCRIPTION

Figure 1:
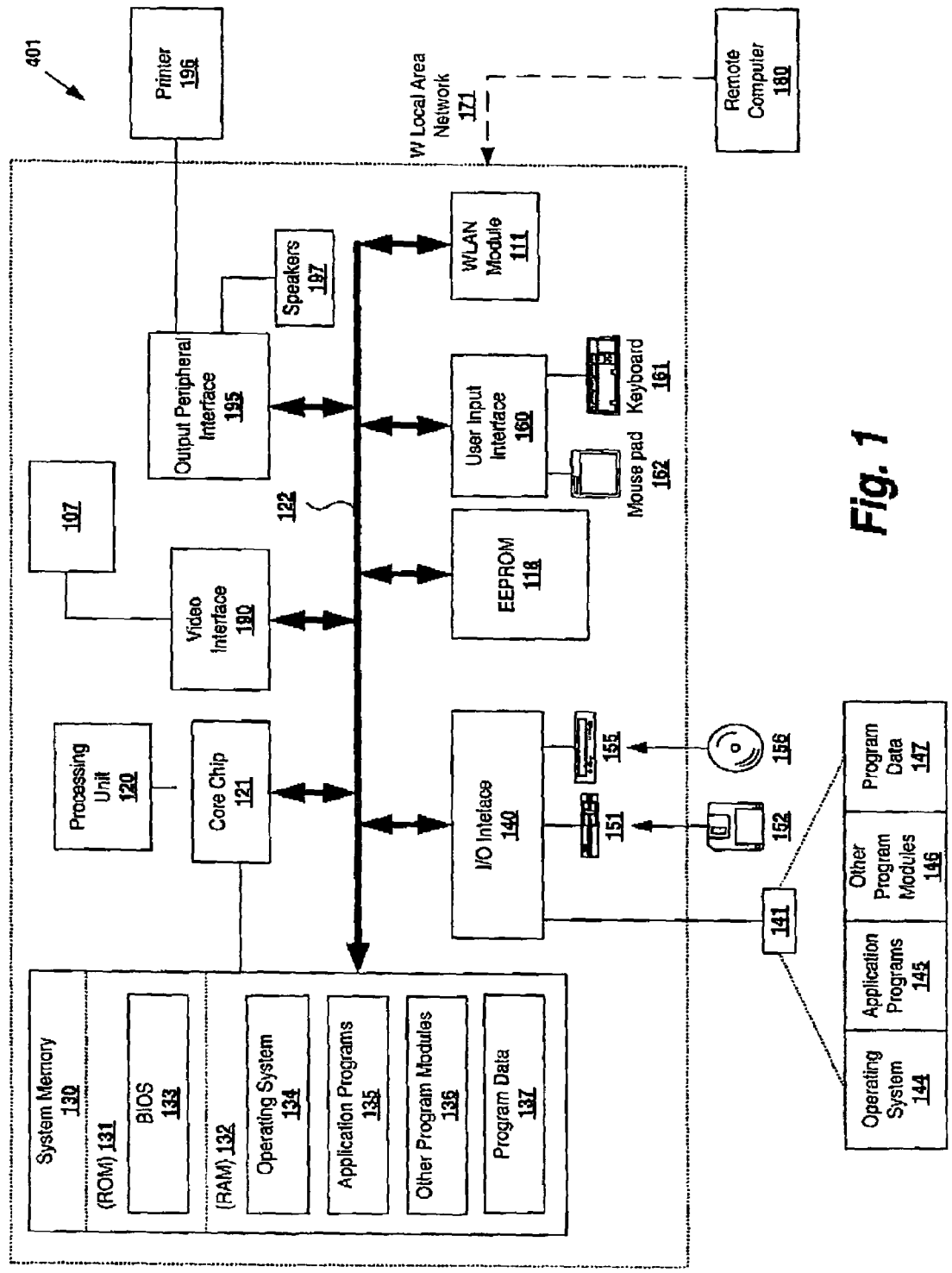
FIG. 1 illustrates an example of a wireless computer system configured in accordance with an embodiment of the present invention.

In the following description, numerous specific details are set forth such as specific network configurations, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring now to the figures, and in particular to FIG. 1, there is illustrated an example of a wireless ready laptop computer 401 within which the invention may be implemented. The laptop system is provided as an example and is not intended to suggest any limitation as to the scope of use or functionality of the invention. Neither should the computing environment be interpreted as having any dependency or requirement relating to any one or combination of components illustrated in the exemplary system environment. Note that the principals of the present invention are not limited to implementation in a laptop computer, but are applicable to any wireless device needing access to a network.

Thus, the invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With specific reference to FIG. 1, there is illustrated an exemplary general purpose computing device, which for purposes of simplification is assumed to be wireless ready laptop computer 401. Computer 401 comprises, but is not limited to, a processing unit 120, which is connected by local bus to core chip 121. Core chip 121 is also connected to system memory 130, and a system bus 122. The system bus 122 may be any of several types of bus structures including a memory bus, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus.

The system memory 130 includes computer storage media in the form of volatile and/or nonvolatile memory such as read only memory (ROM) 131 and random access memory (RAM) 132. For purposes of the invention, computer 401 further comprises an EEPROM 118, connected to the system bus 122. A basic input/output system (BIOS) 133, containing the basic routines that help to transfer information between elements within computer 401, such as during boot-up, is typically stored in ROM 131. RAM 132 typically contains data and/or program modules that are immediately accessible to and/or presently being operated on by processing unit 120. By way of example, and not limitation, the program modules include operating system (OS) 134, application programs 135, other program modules 136, and program data 137.

The computer 401 may also include other removable/non-removable, volatile/nonvolatile computer storage media. By way of example only, FIG. 1 illustrates a hard disk drive 141, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

I/O Interface 140, connects hard disk drive 141, magnetic disk drive 151, and optical disk drive 155 to the system bus 122. The drives and their associated computer storage media discussed above and illustrated in FIG. 1 provide storage of computer readable instructions, data structures, program modules and other data for the computer 401. For example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 401 through input devices such as a keyboard 161 and an integrated pointing device 162 (e.g., a track point or track pad), commonly referred to as a touch pad. These and other input devices are integrated into chassis 101 and are often connected to the processing unit 120 through a user input interface 160 that is coupled to the system bus 122, but may be connected by other interface and bus structures, such as a parallel port, game port or a universal serial bus (USB). A LCD panel 107 is also connected to the system bus 122 via an interface, such as a video interface 190. In addition to the monitor, computers may also include other peripheral output devices such as speakers 197 and printer 196, which may be connected through an output peripheral interface 195.

The computer 401 may operate in a networked environment using logical connections to one or more remote computers, such as a remote computer 180. The remote computer 180 may be another personal computer, a server, a router, a network PC, a peer device or other common network node, and typically includes many or all of the elements described above relative to the computer 401. When used in a WLAN networking environment, the computer 401 is connected to the WLAN 171 through a WLAN network interface or wireless adapter 111. The connection to the networked computer 180 is facilitated by WLAN module 111, which connects via wireless transmission to other components in WLAN 171. WLAN module 111 connects to system bus 122 via an mPCI connector 114. Computer 401 may also be connected via wired LAN and/or the Internet via other connection modules such as a modem. WLAN module 111 will include the radio and antenna.

The invention operates within a communication device (e.g., the laptop computer system 401 of FIG. 1) with which FCC authorized radio-antenna coupling is required for U-NII communication. The computer system is provided to a user with an U-NII approved antenna embedded within the lid or other location that is made relatively inaccessible to the user or difficult to modify/replace without manufacturer authorized support. This prevents the antenna from being tampered with. Also, each embedded antenna has a unique ID, which identifies the antenna as an U-NII antenna that may be utilized to receive and issue wireless transmissions within the particular computer system. In one embodiment, the unique ID is stored within the BIOS. Finally, according to the invention, the particular device and antenna together provide specific identifying characteristics required by any combination of radio and antenna coupling that is to be utilized for wireless communication via the U-NII protocol.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Because most of the implementation of the invention occurs within portable computer systems, such as laptop computer system 401, the remainder of the invention will be described with specific reference to a computer system and software and hardware components thereof.

The present invention is described herein with respect to whether a wireless device, such as wireless device 401, can perform passive scanning and operate on particular wireless channels under the 802.11 specification. However, the present invention is also applicable for whether or not such a wireless device can operate under other authorized parameters, such as transmission power and modulation scheme. Often such other operational parameters are also regulated by governmental entities.

The present invention also makes use of a country code designation within the handshaking association protocol that occurs between a wireless device and a wireless access point under the 802.11d specification. However, other forms of identifying the geographic location within which the wireless device is operating can be used, such as a GPS (global positioning system) signal.

Figure 2:
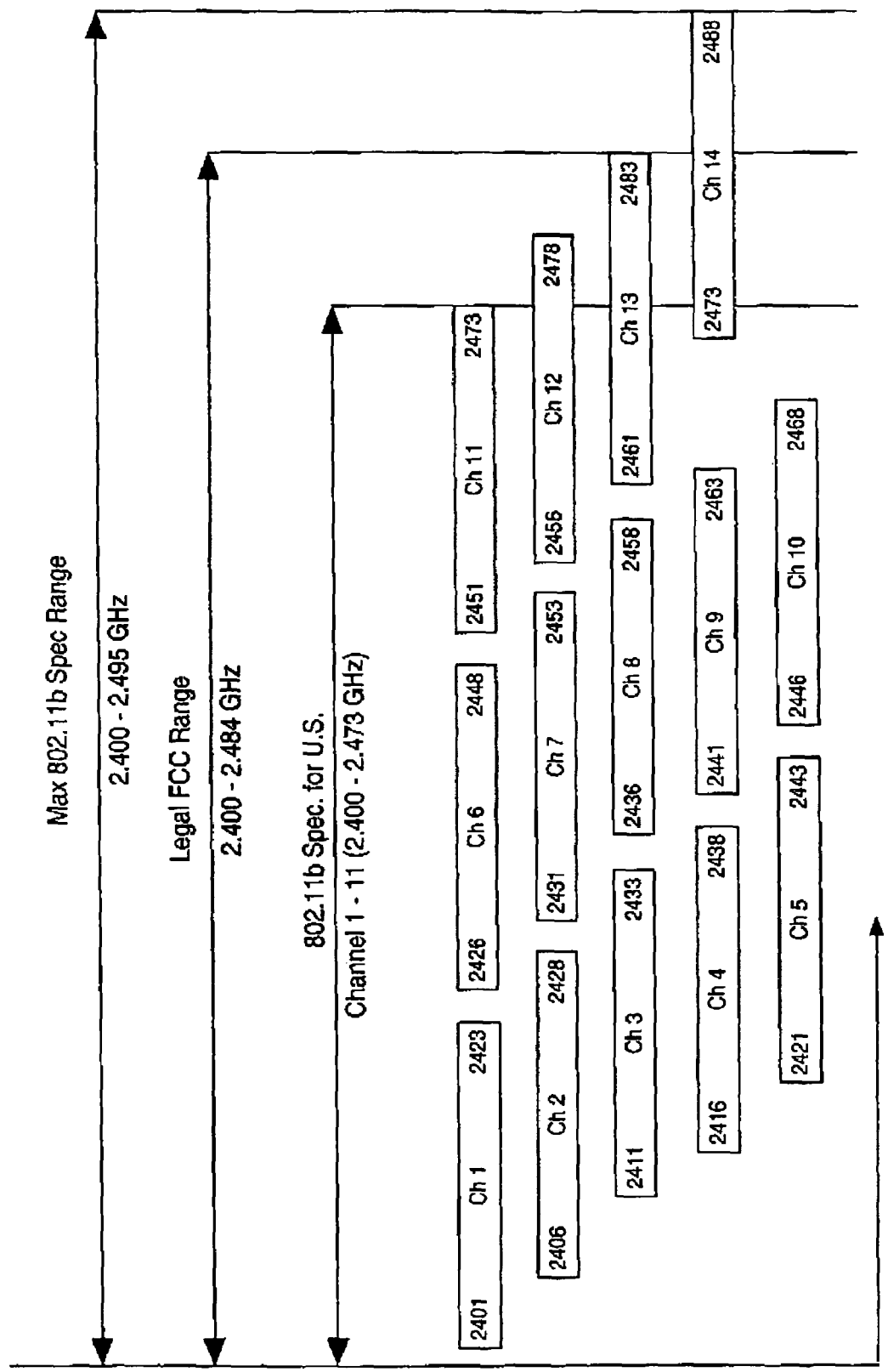
FIG. 2 illustrates authorized 802.11b channels.

Passive scanning is the process whereby wireless devices will scan for 801.11 frequency channels emanating from access points in order to access a network backbone 404, such as the Internet. A problem with passive scanning is that if a wireless device monitors traffic on a particular channel, then it may assume that it is legal to operate within such channel. However, governmental regulations, such as those associated with the FCC, may not permit traffic on all channels (See FIGS. 2 and 3). Under passive scanning, a wireless device does not necessarily know its particular geographical location. The problem is that a wireless device may end up operating under a channel for which it does not have authorization to do so. For a company such as IBM Corp., the problem is that it obtains certificates of authorization for wireless cards before shipping those to customers. Naturally, IBM Corp. may not export such wireless cards to countries where the wireless cards may passively scan themselves into using unauthorized channels. For example, a wireless card authorized for use within the U.S., if exported to Japan, may passively scan and begin using channel 14 which is an authorized channel in Japan but not in the U.S. Remedies such as retrofitting wireless cards or having to send wireless devices with different authorizations are more costly options.

Figure 5:
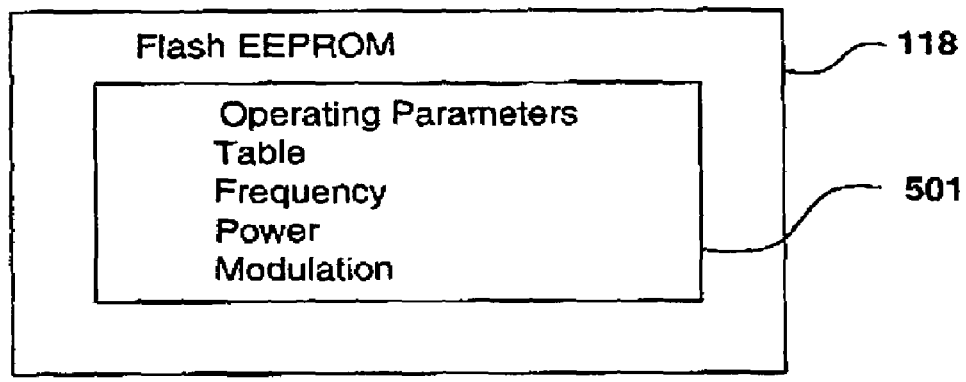
FIG. 5 illustrates a flash EEPROM configured in accordance with an embodiment of the present invention.
Figure 7:
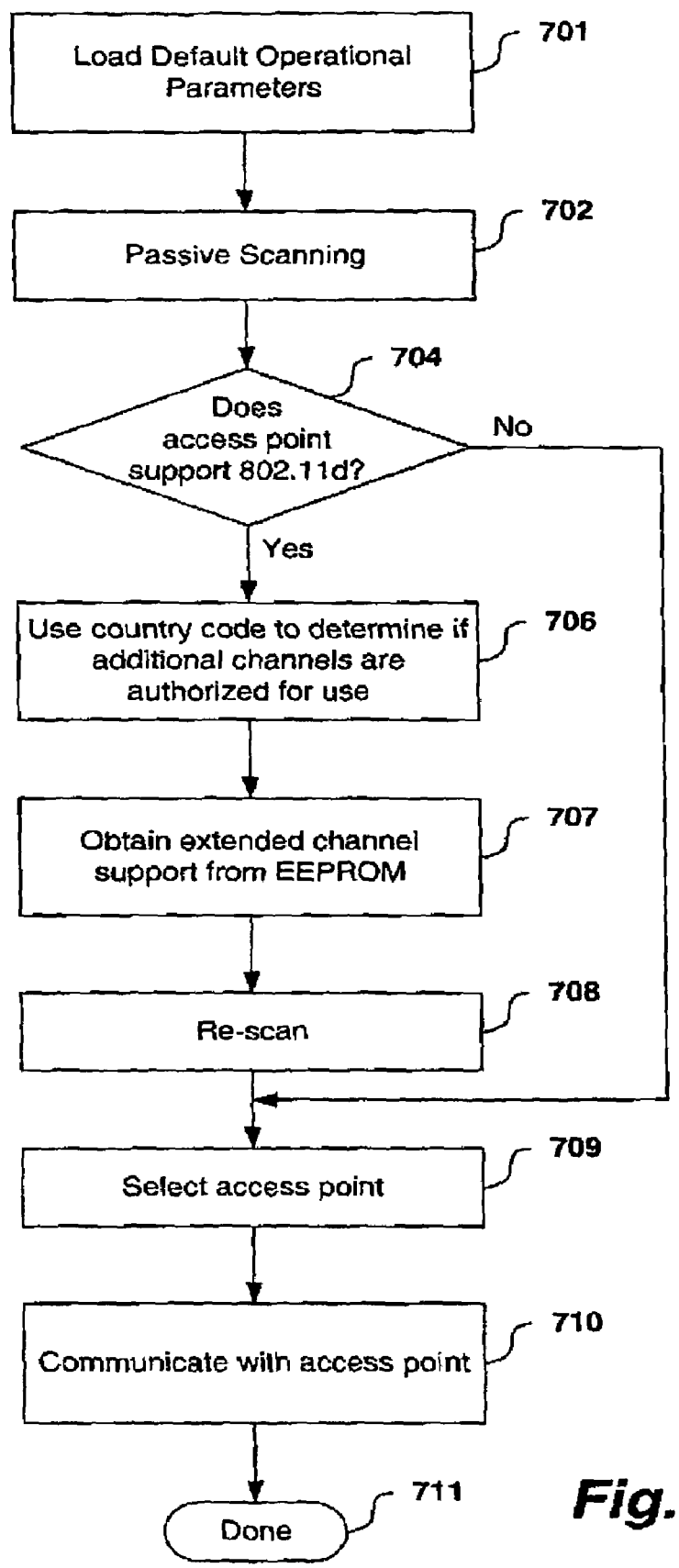
FIG. 7 illustrates a flow diagram configured in accordance with an embodiment of the present invention.

Referring to FIG. 7, wireless device 401 will load default operational parameters, which are settings for which the wireless device can operate practically anywhere within the world, in step 701. Such default operational parameters 501 may be loaded into the flash EEPROM 118, as illustrated in FIG. 5. In step 702, the wireless device will perform passive scanning, looking for a wireless device to connect to. The wireless device 401 will receive signals from an access point 403. Wireless communication 402 then occurs between wireless device 401 and access point 403. A determination will be made in step 704 whether the access point supports the 802.11d specification, whereby a country code is provided to the wireless device 401 by the access point 403, indicating which country the communication is occurring. If not, then the process of the present invention proceeds to step 709. If the access point 403 does support 802.11d, then in step 706, the wireless device 401 will receive the country code from the access point 403, and will determine if the wireless device 401 is authorized to use any channels in addition to the ones set within the default parameters originally loaded. If so, the wireless device 401 in step 707 will modify its operation to then use an re-scan with such additional authorized channels in step 708, in addition to the default channels. In step 709, the wireless device 401 will select an access point 403 based on such factors as signal quality, or a preferential list of access points. The selected access point does not necessarily have to be the same access point from which the country code was obtained. The process is then completed in step 711.

As an example, referring to FIG. 3, the default channels loaded in step 701 would be channels 1-11. However, if access point 403 resides within the country of Japan, then the wireless device 401 upon passive scanning of the access point 403 will discover that channels 12-14 are also available for use. While this device 401 will then determine whether it is authorized by certificate to use the additional channels 12-14. If any one or more of such channels are authorized for use by the wireless device 401, it will modify its operating parameter table 501 to include use within such channels.

Wireless device 401 may be configured to always begin with step 701 by loading only the default operating parameters to start with, since it is possible that the wireless device 401 may have been moved to a geographical location where the previously authorized additional channels are no longer legal for use. For example, the wireless device may have been returned to the U.S. where channels 12-14 are not valid for use.

Figure 4:
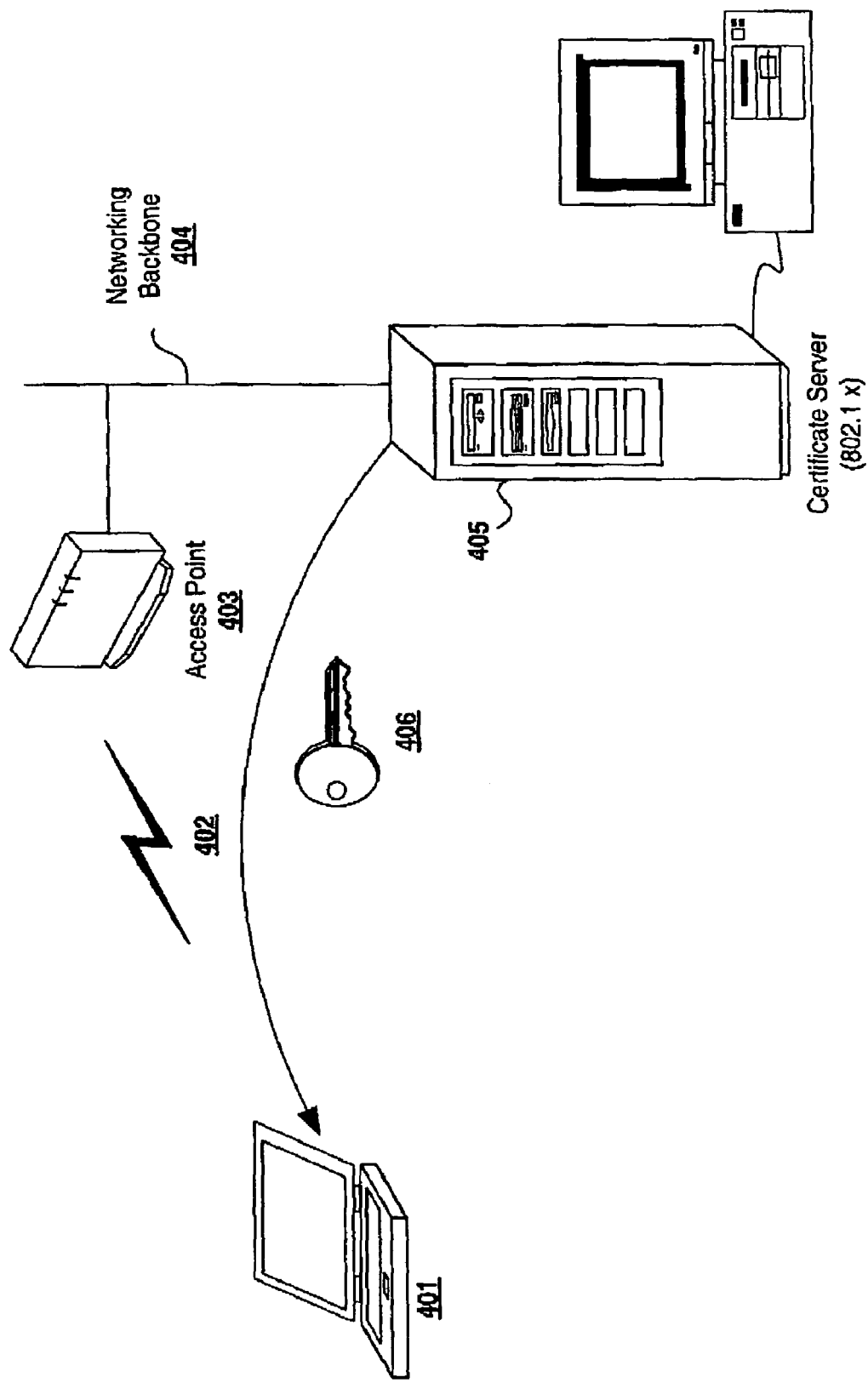
FIG. 4 illustrates a system configured in accordance with an embodiment of the present invention.
Figure 6:
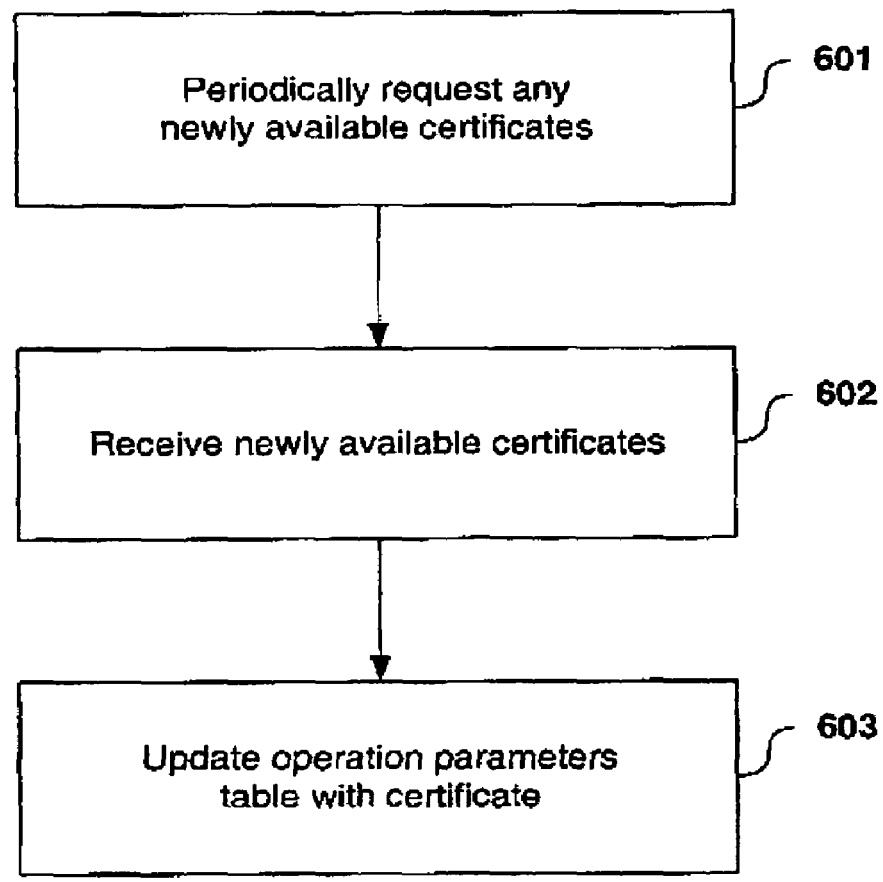
FIG. 6 illustrates periodic update of certificates.

FIG. 6 illustrates a process whereby a wireless device 401 may periodically, such as monthly, weekly, or upon boot-up of wireless device 401 determine whether additional certificates are available for the wireless device. Referring to FIG. 4, in step 601, the wireless device 401 will communicate through the networking backbone 404 to certificate server 405 to determine whether there are any newly available certificates for use by wireless device 401. The certificate server 405 may be operated by a third party entity, or may be operated by the vendor of wireless device 401. The use of wireless device 401 may also pay a fee for access to certificate server 405 for downloading of additional certificates. If there are any additional certificates available, then such newly available certificates 406 will be received by wireless device 401, and it can then update its operation parameters 501 with the new certificate 406 in step 603. This newly updated table of operating parameters 501 will then be used by the wireless device 401 in step 706 from then on.

Although the present invention and its advantages have been described in detail, it should be understood that various changes, substitutions and alterations can be made herein without departing from the spirit and scope of the invention as defined by the appended claims.

What is claimed is:

1. In a wireless device, a method comprising the steps of:
   passively scanning for a wireless signal transmitted from an access point, wherein the scanning is performed using a default set of frequencies;
   determining if a selected access point is providing a geographical indicator to the wireless device, wherein the geographical indicator informs the wireless device where the access point is geographically located;
   utilizing the geographical indicator to determine if the wireless device is authorized to communicate with wireless signal frequencies in addition to the default set of frequencies;
   re-scanning for a wireless signal transmitted from an access point, wherein the re-scanning is performed using the wireless signal frequencies in addition to the default set of frequencies;
   in response to the re-scanning step, selecting an access point to communicate through to the network backbone; and
   the wireless device communicating with the selected access point utilizing any of the default set of frequencies and the wireless signal frequencies in addition to the default set of frequencies;
   wherein the wireless device determines if it is authorized to communicate with the selected access point with wireless signal frequencies in addition to the default set of frequencies by determining if has loaded a certificate indicating such authority.

2. The method as recited in claim 1, further comprising the step of:
   loading the default set of frequencies upon power up of the wireless device.

3. The method as recited in claim 1, wherein the geographical indicator is a country code sent in a wireless signal from the selected access point to the wireless device indicating in what country of the world the selected access point is located.

4. The method as recited in claim 3, wherein the selected access point operates under an IEEE 802.11d specification.

5. The method as recited in claim 1, further comprising the steps of:
   the wireless device periodically accessing a certificate server over a network backbone; and
   downloading any new certificates from the certificate server in order to provide the wireless device with authorization to communicate with access points utilizing frequencies in addition to the default set of frequencies.

6. A wireless device operating under IEEE 802.11 specifications, comprising:
   circuitry for passively scanning for a wireless access point coupled to a network backbone, wherein the scanning is performed using a default set of channels;
   circuitry for determining if the access point operates under an IEEE 802.11d specification, providing a geographical indicator to the wireless device, wherein the geographical indicator informs the wireless device where the access point is geographically located;
   circuitry for utilizing the geographical indicator to determine if the wireless device is legally authorized to communicate with wireless signal channels in addition to the default set of channels; and
   circuitry for communicating with a selected access point utilizing any of the default set of channels and the wireless signal channels in addition to the default set of channels;
   wherein the geographical indicator is a country code sent in a wireless signal from the selected access point to the wireless device indicating in what country of the world the selected access point is located;
   wherein the wireless device determines if it is legally authorized to communicate with the selected access point with wireless signal channels in addition to the default set of channels by determining if has loaded a certificate indicating such authority.

7. The device as recited in claim 6, further comprising:
   circuitry for loading the default set of channels upon power up of the wireless device.

8. The device as recited in claim 6, wherein the set of default channels is channels 1-11 under the IEEE 802.11 specifications, and wherein the wireless signal channels in addition to the default set of channels may include any one or more of channels 12-14.

* * * * *